United States Patent
Seedorf et al.

(10) Patent No.: US 10,142,390 B2
(45) Date of Patent: Nov. 27, 2018

(54) METHOD AND SYSTEM FOR PROVIDING CONTENT IN CONTENT DELIVERY NETWORKS

(71) Applicant: NEC EUROPE LTD., Heidelberg (DE)

(72) Inventors: Jan Seedorf, Heidelberg (DE); Mayutan Arumaithurai, Goettingen (DE)

(73) Assignee: NEC CORPORATION, Tokyo (JP)

(*) Notice: Subject to any disclaimer, the term of this patent is extended or adjusted under 35 U.S.C. 154(b) by 186 days.

(21) Appl. No.: 14/765,835

(22) PCT Filed: Feb. 15, 2013

(86) PCT No.: PCT/EP2013/053117
§ 371 (c)(1),
(2) Date: Aug. 5, 2015

(87) PCT Pub. No.: WO2014/124692
PCT Pub. Date: Aug. 21, 2014

(65) Prior Publication Data
US 2015/0373079 A1 Dec. 24, 2015

(51) Int. Cl.
*H04L 29/06* (2006.01)
*H04L 29/08* (2006.01)
(Continued)

(52) U.S. Cl.
CPC .............. *H04L 65/80* (2013.01); *G06F 17/30* (2013.01); *G06F 17/3089* (2013.01);
(Continued)

(58) Field of Classification Search
CPC ...... H04L 67/18; H04L 67/10–67/2895; H04L 65/00–65/80
See application file for complete search history.

(56) References Cited

U.S. PATENT DOCUMENTS 8,909,736 B1* 12/2014 Bosch ................. H04L 67/1093
709/217
8,924,508 B1* 12/2014 Medved ............ H04L 29/08072
709/217
(Continued)

FOREIGN PATENT DOCUMENTS

EP 2410743 A1 1/2012
WO WO 2012167106 A1 12/2012

OTHER PUBLICATIONS

Ni, Wei, et al. "Capability Information Advertising for CDN Interconnection." (2012).*
(Continued)

*Primary Examiner* — Emmanuel L Moise
*Assistant Examiner* — Julian Chang
(74) *Attorney, Agent, or Firm* — Leydig, Voit & Mayer, Ltd.

(57) ABSTRACT

A method delivers content in content delivery networks that include an upstream content delivery network and a downstream content delivery network comprising at least two content delivery entities. The upstream and downstream content delivery networks are connected to each other. A user equipment is connected to the downstream content delivery network. The method includes requesting a content stream by the user equipment, providing the content stream by the upstream content delivery network, redirecting the content stream to a content delivery entity, and providing the content stream to the user equipment. Network information of the downstream content delivery network and/or user equipment information are determined. Probabilities for the content delivery entities are determined for optimized content stream performance. The user equipment is connected to the content delivery entity having the highest probability.

(Continued)

US 10,142,390 B2

Page 2

The content stream is redirected to the content delivery entity and delivered to the user equipment.

20 Claims, 2 Drawing Sheets

(51) Int. Cl.
*G06F 17/30* (2006.01)
*H04N 21/00* (2011.01)

(52) U.S. Cl.
CPC ...... *H04L 65/1069* (2013.01); *H04L 65/4069* (2013.01); *H04L 65/4084* (2013.01); *H04L 65/601* (2013.01); *H04L 65/608* (2013.01); *H04L 67/02* (2013.01); *H04L 67/289* (2013.01); *H04L 67/2847* (2013.01); *H04N 21/00* (2013.01); *H04L 67/1002* (2013.01); *H04L 67/18* (2013.01)

(56) References Cited

U.S. PATENT DOCUMENTS

| | | | | |
|---|---|---|---|---|
| 9,331,976 | B2* | 5/2016 | Choi | H04L 61/1511 |
| 9,332,292 | B2* | 5/2016 | Gavade | H04N 21/26258 |
| 9,413,847 | B2* | 8/2016 | Medved | H04L 45/02 |
| 9,607,132 | B2* | 3/2017 | van Brandenburg | G06F 21/10 |
| 9,686,148 | B2* | 6/2017 | Varney | H04L 41/50 |
| 9,705,754 | B2* | 7/2017 | Crowder | H04L 41/50 |
| 9,722,882 | B2* | 8/2017 | Varney | H04L 41/50 |
| 9,722,883 | B2* | 8/2017 | Varney | H04L 41/50 |
| 9,722,884 | B2* | 8/2017 | Newton | H04L 41/50 |
| 9,723,047 | B2* | 8/2017 | Van Brandenburg | H04L 65/608 |
| 9,747,009 | B2* | 8/2017 | Jadhav | G06F 3/04842 |
| 2003/0233423 | A1* | 12/2003 | Dilley | H04L 29/06 709/214 |
| 2007/0149216 | A1* | 6/2007 | Misikangas | H04W 64/00 455/456.1 |
| 2008/0021777 | A1* | 1/2008 | Mack | G09F 21/04 705/14.1 |
| 2009/0160735 | A1* | 6/2009 | Mack | G06Q 30/02 345/2.3 |
| 2010/0268789 | A1* | 10/2010 | Yoo | H04L 67/2842 709/214 |
| 2011/0072105 | A1* | 3/2011 | Biderman | H04N 7/17318 709/217 |
| 2011/0124334 | A1* | 5/2011 | Brisebois | H04W 48/16 455/434 |
| 2011/0125919 | A1* | 5/2011 | Kwon | H04N 21/23439 709/231 |
| 2011/0295942 | A1* | 12/2011 | Raghunath | H04L 45/00 709/203 |
| 2011/0296053 | A1* | 12/2011 | Medved | H04L 67/104 709/241 |
| 2012/0042090 | A1* | 2/2012 | Chen | H04L 65/607 709/231 |
| 2012/0117214 | A1* | 5/2012 | Mengle | G06F 9/5055 709/223 |
| 2012/0144000 | A1* | 6/2012 | Nogami | H04L 65/4084 709/219 |
| 2012/0185370 | A1* | 7/2012 | Davie | G06Q 30/04 705/34 |
| 2012/0215850 | A1* | 8/2012 | Kiesel | H04L 67/104 709/204 |
| 2012/0263434 | A1* | 10/2012 | Wainner | H04N 5/765 386/241 |
| 2013/0054682 | A1* | 2/2013 | Malik | H04W 4/001 709/203 |
| 2013/0094445 | A1* | 4/2013 | De Foy | H04L 45/021 370/328 |
| 2013/0138732 | A1* | 5/2013 | Randriamasy | H04L 67/104 709/203 |
| 2013/0159388 | A1* | 6/2013 | Forsman | H04N 21/64322 709/203 |
| 2013/0204961 | A1* | 8/2013 | Fliam | H04L 67/2885 709/214 |
| 2013/0282890 | A1* | 10/2013 | Ma | H04L 43/12 709/224 |
| 2014/0026052 | A1* | 1/2014 | Thorwirth | G06F 3/01 715/721 |
| 2014/0052823 | A1* | 2/2014 | Gavade | H04N 21/2541 709/219 |
| 2014/0108672 | A1* | 4/2014 | Ou | H04L 61/1511 709/238 |
| 2014/0115724 | A1* | 4/2014 | van Brandenburg | G06F 21/10 726/30 |
| 2014/0156822 | A1* | 6/2014 | Choi | H04L 61/303 709/223 |
| 2014/0164998 | A1* | 6/2014 | Jadhav | G06F 17/30749 715/810 |
| 2014/0172944 | A1* | 6/2014 | Newton | H04L 67/289 709/202 |
| 2014/0173025 | A1* | 6/2014 | Killick | H04N 21/266 709/217 |
| 2014/0230003 | A1* | 8/2014 | Ma | H04N 21/231 725/115 |
| 2014/0245359 | A1* | 8/2014 | De Foy | H04N 21/6181 725/62 |
| 2014/0250230 | A1* | 9/2014 | Brueck | H04L 65/607 709/226 |
| 2014/0280679 | A1* | 9/2014 | Dey | H04L 67/2842 709/213 |
| 2014/0344391 | A1* | 11/2014 | Varney | H04N 21/231 709/213 |
| 2014/0344399 | A1* | 11/2014 | Lipstone | H04L 67/288 709/217 |
| 2014/0344400 | A1* | 11/2014 | Varney | H04L 45/745 709/217 |
| 2014/0344401 | A1* | 11/2014 | Varney | H04L 67/1097 709/217 |
| 2014/0344425 | A1* | 11/2014 | Varney | H04L 41/0813 709/221 |
| 2014/0344452 | A1* | 11/2014 | Lipstone | H04L 41/509 709/224 |
| 2014/0344453 | A1* | 11/2014 | Varney | H04L 41/0803 709/224 |
| 2014/0379871 | A1* | 12/2014 | Van Brandenburg | H04L 65/4084 709/219 |
| 2015/0006615 | A1* | 1/2015 | Wainner | H04L 29/06047 709/203 |
| 2015/0026352 | A1* | 1/2015 | De Foy | H04L 67/16 709/228 |
| 2015/0085875 | A1* | 3/2015 | Phillips | H04L 65/601 370/465 |
| 2015/0134730 | A1* | 5/2015 | Seedorf | H04L 67/42 709/203 |
| 2015/0215359 | A1* | 7/2015 | Bao | H04L 65/605 709/219 |
| 2015/0222595 | A1* | 8/2015 | Reddy | H04L 61/2528 709/226 |
| 2015/0256581 | A1* | 9/2015 | Kolhi | H04L 65/602 709/219 |
| 2015/0256583 | A1* | 9/2015 | Rosenzweig | H04L 65/602 709/219 |
| 2015/0281367 | A1* | 10/2015 | Nygren | H04L 47/193 709/228 |
| 2015/0373079 | A1* | 12/2015 | Seedorf | H04L 67/2847 709/218 |
| 2016/0065995 | A1* | 3/2016 | Phillips | H04N 21/238 725/62 |
| 2016/0119408 | A1* | 4/2016 | Bertz | H04L 12/189 709/203 |
| 2016/0198202 | A1* | 7/2016 | Van Brandenburg | H04N 21/26258 725/31 |
| 2016/0255535 | A1* | 9/2016 | De Foy | H04L 67/2804 |
| 2016/0269801 | A1* | 9/2016 | Harden | H04N 21/6373 |

(56) References Cited

U.S. PATENT DOCUMENTS

| | | | |
|---|---|---|---|
| 2016/0323365 A1* | 11/2016 | Wu | H04L 67/2814 |
| 2017/0126839 A1* | 5/2017 | Koreeda | H04L 67/325 |
| 2017/0142180 A1* | 5/2017 | McGowan | H04L 65/602 |
| 2017/0171590 A1* | 6/2017 | Ma | H04N 21/4147 |

OTHER PUBLICATIONS

Telemaco Melia, A. L. B. L. F., and Dirk Staehle. "Advanced CDN mechanisms for video streaming."*

Arumaithurai, Mayutan, et al. "Evaluation of ALTO-enhanced request routing for CDN interconnection." Communications (ICC), 2013 IEEE International Conference on. IEEE, 2013.*

Stiemerling, Martin, et al. "ALTO deployment considerations." (2012).*

Shin, et al. "CDNI Request Routing with SDN," IETF 2012.*

Peterson, Larry, and Bruce Davie. "Framework for CDN interconnection." IETF (2012).*

Brandenburg, Ray van, et al. "Models for HTTP-Adaptive-Streaming-Aware Content Distribution Network Interconnection (CDNI)." (2013).*

Yoshimura, Takeshi, et al. "Mobile streaming media CDN enabled by dynamic SMIL." Proceedings of the 11th international conference on World Wide Web. ACM, 2002.*

* cited by examiner

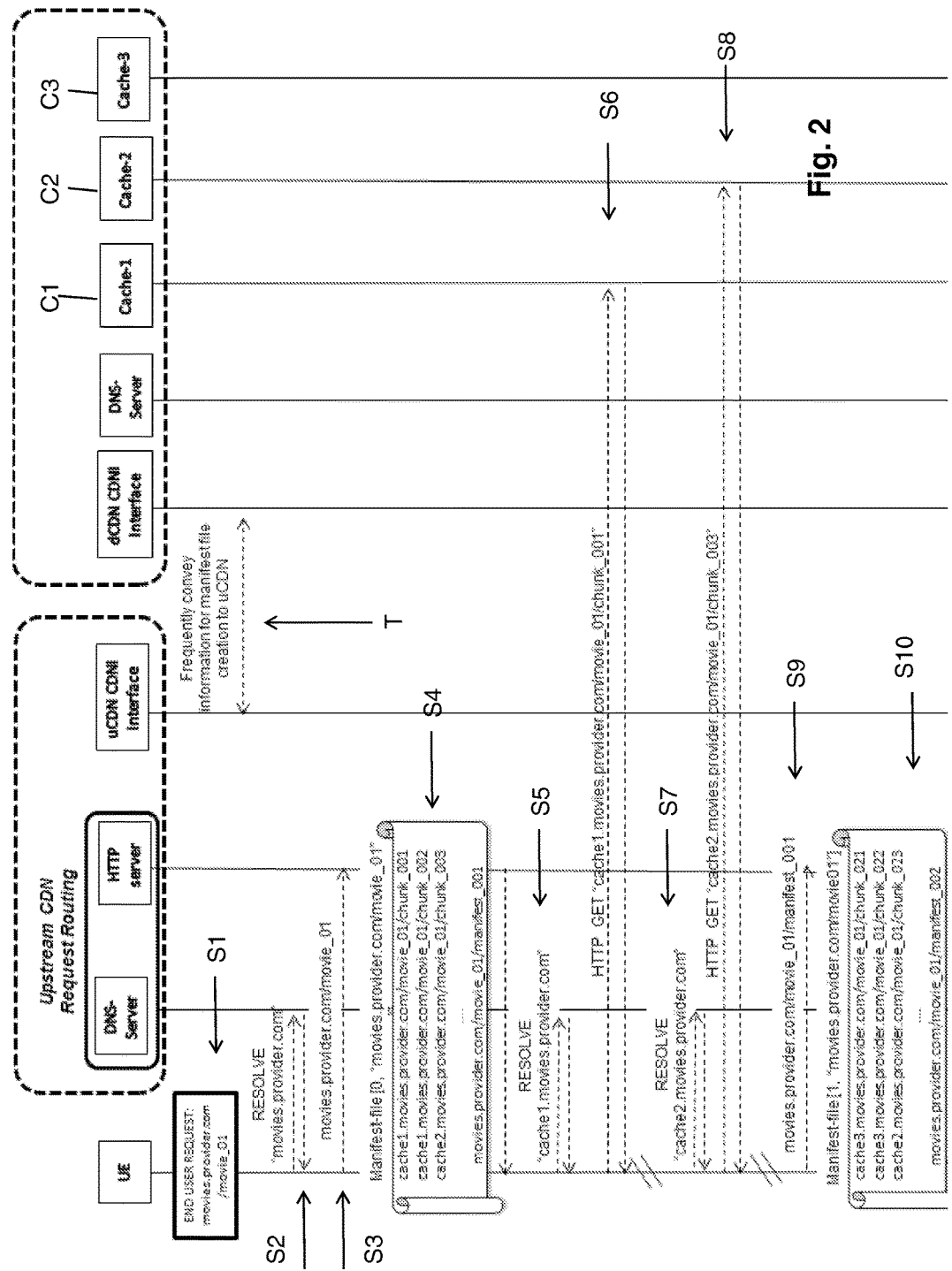

METHOD AND SYSTEM FOR PROVIDING CONTENT IN CONTENT DELIVERY NETWORKS

CROSS-REFERENCE TO PRIOR APPLICATIONS

This application is a U.S. National Phase application under 35 U.S.C. § 371 of International Application No. PCT/EP2013/053117, filed on Feb. 15, 2013. The International Application was published in English on Aug. 21, 2014 as WO 2014/124692 under PCT Article 21(2).

FIELD

The present invention relates to a method for providing content in content delivery networks.

BACKGROUND

Content delivery networks are more and more deployed within operator networks, for example of internet content providers or mobile operators. As a consequence there is a need for interconnecting these local content delivery networks. Such a content delivery network interconnection enables for example that an upstream content delivery network that receives a request for content from a client may redirect this request to a downstream content delivery network, for example to a router of the downstream content delivery network which performs further redirection to a content delivery entity providing the content for a user equipment connected to the downstream content delivery network. Such a content delivery network interconnection may for example be useful in cases where users from a certain country travel to other countries and try to receive content from their home operator. A redirection to an operator in the visited country is preferred since this operator might have caches closer to the user's current location. Therefore, this is providing in general a more stabile content stream when requesting content.

Such a conventional interconnection between two content delivery networks may be realized as follows: For example a content service provider has an agreement with a content delivery network provider A for delivery of its content. Independently content delivery network provider A and content delivery network provider B agree to interconnect their content delivery networks CDN. When a user agent respectively end user requests content from a content service provider content delivery network provider A may consider that a delivery by content delivery network provider B is more suitable, for instance because content delivery network B is a so-called access content delivery network allowing end users to directly attach to it. Since the content delivery network A CDN-A and a content delivery network B CDN-B are interconnected with each other the content delivery network A CDN-A may redirect the request of the end user to content delivery network B CDN-B and the contents is then actually delivered to the end user by the content delivery network B CDN-B.

When an end user requests content the content may be provided by HTTP adaptive streaming, abbreviated with HAS, which is defined as a streaming technology allowing a client/user equipment to adaptively switch between multiple bitrates depending on current network conditions. Since HTTP adaptive streaming is HTTP-based, it is a pull-based mechanism with a client/user equipment actively requesting content segments instead of the content being pushed to the client/user equipment by a server. With regard to content delivery network using HTTP adaptive streaming causes problems: HTTP adaptive streaming uses so-called manifest files. Such a manifest file is a file a client/user equipment retrieves when querying for HTTP adaptive streaming content containing information where individual chunks for each supported bitrate of the HAS content stream can be retrieved. A conventional manifest file may be organized according to the "absolute URL without redirection"-principle in which case for each chunk and bitrate combination an absolute URL to a surrogate server/content delivery entity in the corresponding content delivery network is included in the manifest file. A conventional manifest file may also be organized according to the "absolute URLs with redirection"-principle: For each chunk a link to a content delivery network request router performing a further redirection is then included in the manifest file.

This has some drawbacks in particular in a content delivery network interconnection scenario: If for example the client is provided with a manifest file redirecting each chunk to the request router of the downstream content delivery network this implies a complicated request routing process for each individual chunk of the HAS content stream which increases significantly the load between both content delivery networks.

If for example the manifest file contains links to downstream content delivery network surrogates/content delivery entities this inhibits any flexibility with regard to allocation of a chunk request to content delivery network surrogates/content delivery entities in the downstream content delivery network.

SUMMARY

In an embodiment, the present invention provides a method to deliver content in content delivery networks. The content delivery networks include an upstream content delivery network and a downstream content delivery network comprising at least two content delivery entities. The upstream and downstream content delivery networks are connected to each other. A user equipment is connected to the downstream content delivery network. The method includes receiving a request for a content stream from the user equipment, providing the content stream by the upstream content delivery network, redirecting the content stream to a content delivery entity, and providing the content stream to the user equipment. Network information of the downstream content delivery network and/or user equipment information are determined. Probabilities for the content delivery entities are determined for optimized content stream performance. The user equipment is connected to the content delivery entity having the highest probability. The content stream is redirected to the content delivery entity and delivered to the user equipment.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 2 shows a part of a message chart of a method according to a further embodiment of the present invention.

DETAILED DESCRIPTION

Figure 1:
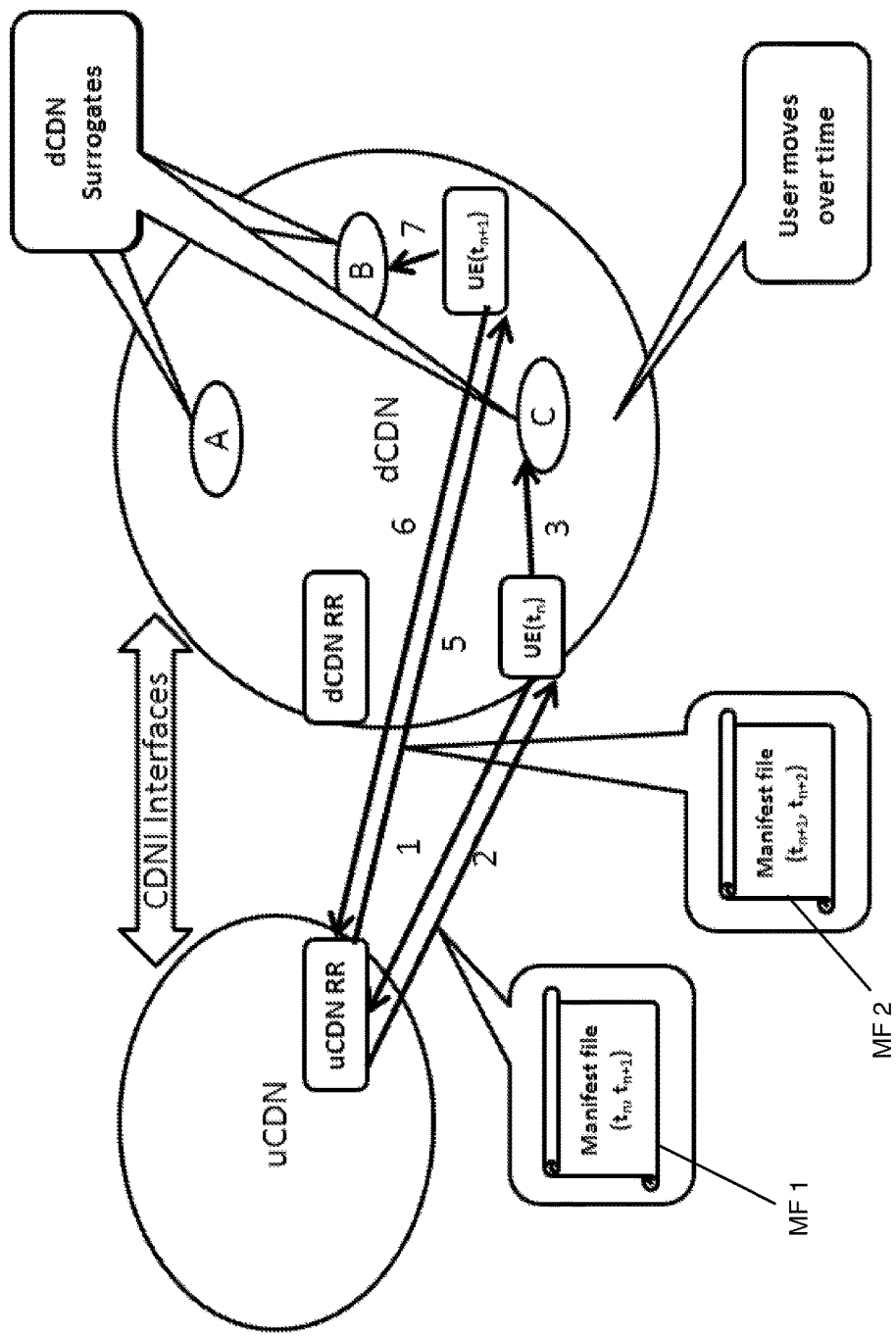
FIG. 1 shows a schematic view of a system according to an embodiment of the present invention.

The present invention relates to a method for providing content in content delivery networks, having an upstream content delivery network, a downstream content delivery network, comprising at least two content delivery entities, wherein the upstream and downstream content delivery network are connected to each other and a user equipment connected to one of the content delivery entities in the downstream content delivery network comprising the steps of a) Requesting a content stream for a content by the user equipment from the downstream content delivery network,
b) Providing the content stream by the upstream content delivery network,
c) Redirecting the content stream from the upstream content delivery network to the content delivery entity in the downstream content delivery network,
d) Providing the content stream by the content delivery entity of the downstream content delivery network to the user equipment.

The present invention also relates to a system for providing content in content delivery networks, preferably for performing with a method according to the embodiments, comprising an upstream content delivery network, a downstream content delivery network, comprising at least two content delivery entities, wherein the upstream and downstream content delivery network are connected to each other and a user equipment connected to one of the content delivery entities in the downstream content delivery network, wherein the user equipment is configured to be operable to request a content stream for a content from the downstream content delivery network, wherein the upstream content delivery network is configured to be operable to provide the content stream to the downstream content delivery network, wherein the upstream content delivery network and/or the downstream content delivery network are configured to be operable to redirect the content stream to one of the content delivery entities in the downstream content delivery network and wherein the content delivery entity is configured to be operable to provide the content stream by the content delivery entity of the downstream content delivery network to the user equipment.

Although applicable to content provided by content delivery networks in general the present invention will be described with regard to content streams in particular adaptive content streams.

In an embodiment, the present invention provides a method and a system for providing content in content delivery networks which enable flexibility for assigning content request to different content delivery entities and minimize an increase in load between an upstream content delivery network and a downstream content delivery network when providing content.

In an embodiment, the present invention provides a method and a system for providing content in content delivery networks enabling a good quality of experience for users requesting content.

According to an embodiment of the invention, a method provides content in content delivery networks that include an upstream content delivery network, a downstream content delivery network, comprising at least two content delivery entities, wherein the upstream and downstream content delivery network are connected to each other and a user equipment connected to one of the content delivery entities in the downstream content delivery network. The method comprises the steps of a) Requesting a content stream for a content by the user equipment from the downstream content delivery network,
b) Providing the content stream by the upstream content delivery network,
c) Redirecting the content stream from the upstream content delivery network to the content delivery entity in the downstream content delivery network,
d) Providing the content stream by the content delivery entity of the downstream content delivery network to the user equipment.

According to a further embodiment of the invention, the method further comprises the steps of e) Determining network information of the downstream content delivery network and/or user equipment information,
f) Determining probabilities for the content delivery entities based on the result of step e) for optimized content stream performance of the user equipment,
g) Connecting the user equipment to the content delivery entity having the highest probability according to step f),
h) Redirecting the content stream to the determined content delivery entity for providing the content stream to the user equipment,
  wherein steps e)-h) are performed at least twice, preferably continuously in certain time intervals until the content stream has ended.

According to an even further embodiment of the invention, a system for providing content in content delivery networks, preferably for performing with a method according to the embodiments, the system comprises
  an upstream content delivery network,
  a downstream content delivery network, comprising at least two content delivery entities, wherein the upstream and downstream content delivery network are connected to each other and
  a user equipment connected to one of the content delivery entities in the downstream content delivery network,
  wherein the user equipment is configured to be operable to request a content stream for a content from the download content delivery network,
  wherein the upstream content delivery network is configured to be operable to provide the content stream to the downstream content delivery network,
  wherein the upstream content delivery network and/or the downstream content delivery network are configured to be operable to redirect the content stream to one of the content delivery entities in the downstream content delivery network and
  wherein the content delivery entity is configured to be operable to provide the content stream by the content delivery entity of the downstream content delivery network to the user equipment.

According to an even further embodiment of the invention, the system is characterized in that the upstream content delivery network is configured to be operable to e) determine network information of the downstream content delivery network and/or user equipment information, to
f) determine probabilities for the content delivery entities based on the network information of the downstream content delivery network and/or user equipment information for optimized content stream performance, to g) connect the user equipment to the content delivery entity having the highest probability, and to
h) redirect the content stream to the determined content delivery entity for providing the content stream to the user equipment,
and that the upstream content delivery network is configured to be operable to perform e)-h) at least twice, preferably continuously in certain time intervals ($t_n$, $t_{n+1}$, $t_{n+2}$) until the content stream has ended.

According to an embodiment of the invention, it has been recognized that depending on network information and/or user equipment information and in particular in case of a HTTP adaptive content stream flexibility is ensured since different chunk or content port requests may be individually redirected to different content delivery entities.

According to an embodiment of the invention, it has been further recognized that only a redirection of the content stream is provided if changing network information and/or changing user equipment information suggest or require a redirection of the content stream to another content delivery entity in the download content delivery network.

According to an embodiment of the invention, it has further been recognized that a low content delivery network interconnection request routing overhead is induced while at the same time direct redirection to downstream content delivery network caches/content delivery entities over a certain period of time is enabled where within this period of time with high probability the caches/content delivery entities are optimal for content stream performance for the user equipment.

According to an embodiment of the invention, it has further been recognized that the "best" or "optimal" surrogates/content delivery entities for different timeframes and for a given end user request is provided.

Further features, advantages and preferred embodiments of the present invention are described in the following subclaims.

According to a preferred embodiment of the invention, steps g) and/or h) are induced by the upstream content delivery network, preferably by adapting a manifest file of the content stream. This provides inter alia the following advantages: When the upstream content delivery network has a direct business agreement with the content provider which may not allow to delegate manifest file rewriting to a further network, i.e. the downstream content delivery network, or is at least provided in such a way that the upstream content delivery network must maintain control of the manifest file rewriting the upstream content delivery network maintains control when and for how long a user equipment redirected to content delivery entities of a download content delivery network. For example in case there are other competing downstream content delivery networks which may be more suitable for serving the user equipment request at a certain future point in time the upstream content delivery network can decide by rewriting the manifest file which downstream content delivery network is used. Another advantage is, that since the upstream content delivery network usually has to compensate the download content delivery network respectively the corresponding operator for its services the operator of the upstream content delivery network may only want to redirect to a download content delivery network for a limited amount of time, for example to handle a temporary overload in its own content delivery network therefore minimizing costs. An even further advantage is that the upstream content delivery network has more information about the content stream, in particular of a HTTP adaptive stream chunk structure so that a more optimized redirection may be performed. In case of lifestreaming the upload content delivery network can predict when new chunks of a HAS content stream are available. Therefore a better content delivery entity in terms of performance of the content stream may be chosen when providing the content stream to the user equipment.

According to a further preferred embodiment of the invention, the time intervals are calculated for performing steps e)-h) based on actual and/or previous network information and/or user information. This enables a more optimized content stream and therefore an increased quality of experience for a user of the user equipment requesting the content stream.

According to a further preferred embodiment of the invention, future manifest files for future time intervals are generated and preferably linked with each other. Therefore after a certain timeframe or time interval the next manifest file for the next time period, i.e. future time period is provided in a very easy way reducing data traffic for new manifest files within the content delivery networks. The calculation of future manifest files for future timeframes enables a fast provision of these manifest files in case a future manifest file becomes an actual manifest file after the previous time interval has ended. Time consuming calculations and a request plus transfer of this new manifest file when required, is avoided.

According to a further preferred embodiment of the invention, the data connectivity in the geographic region of the user equipment and/or the mobility pattern of the user equipment is determined for determining the user equipment information according to step e). By determining the mobility pattern of the user equipment respectively of the user of the user equipment, preferably in the last time period/time interval enables to determine how fast a user changes his/her location. When determining the data connectivity available in the geographic region of the user a more precise determination which content delivery entity is optimal for the user is enabled: For example in case a user moves slowly and is in a large region that is only covered with EDGE connectivity it can be estimated that the user will not have more than about 64 to 220 kilobit/s download bandwidth in the near future. This information is then used for calculating the probability for an optimized content stream and therefore for determining an optimal content delivery entity during the next time period/time interval.

According to a further preferred embodiment of the invention, for determining the network information according to step e), internal state information of the downstream content delivery network, preferably including load on content delivery entities, congestion within the downstream content delivery network and/or maximum bandwidth on links to content delivery entities are used. This enables an easy and a more detailed calculation of probabilities for choosing an optimized content delivery entity within a certain timeframe/time interval.

According to a further preferred embodiment of the invention, content stream type information of the requested content stream, preferably bitrates of the requested content stream, is evaluated based on network information and based on the evaluation, steps b)-d) are adapted. This enables for example that certain bitrates could be excluded or suppressed according to the current situation of the user equipment and according to the current situation within the downstream content delivery network. For instance in case of a temporarily congested geographic region within the downstream downlink content delivery network these internal state information may be provided to the upstream content delivery network in such a way that high bitrates are to be excluded for the next manifest file, in order to prevent the situation where the user equipment's local speed measurement is incorrect and the user equipment tries to download a content stream having high bitrate which currently cannot be satisfied by the content delivery entity in the download content delivery network.

According to a further preferred embodiment of the invention, meta-data is included in the requested content stream and evaluated by the user equipment, preferably for triggering a request for the next manifest file. By including meta-data into the requested content stream further information could be conveyed with the manifest file respectively the requested content stream. In particular for example the manifest file may contain meta-data informing the user equipment when to trigger the next request for the next manifest file, so that this net manifest file is fetched in time.

According to a further preferred embodiment of the invention, the information for the next future content delivery entity is prefetched by the user equipment, preferably by providing next future content delivery information included in meta-data information. This enables a more smooth redirection of the content stream from one content delivery entity to another content delivery entity, since the next manifest file is fetched early enough to allow for twice the expected time it will take to fetch it. For example the meta-data information might be used to inform the user equipment of certain events which might require the user equipment to request or fetch a new manifest file. For example this meta-data information might include the information that the user equipment moves to a mobile network with a GPRS connection, so a new manifest file is required for optimal performance of the requested content stream.

According to a further preferred embodiment of the invention, prefetching of the information for a next future content delivery entity is performed regularly after certain time intervals, wherein these time intervals are based on time durations of part of the content stream and roundtrip time of a part of the content stream. This ensures that a user equipment fetches a new/next future manifest file early enough avoiding time delays in the content stream.

According to a further preferred embodiment of the invention, the downstream content delivery network performs and/or initiates steps e) and f). The downstream content delivery network for example has more and/or detailed status information in particular in case of content delivery entities or congestion information. Therefore the downstream content delivery network is able to predict more precisely content delivery entities for optimized content stream performance with high probability.

According to a further preferred embodiment of the invention, the download content delivery network, in particular an edge entity comprising an interface to the upstream content delivery network, aggregates information of its content delivery entities. This has inter alia the advantage that the traffic and computation overhead between the two content delivery network interfaces is reduced. For example the download content delivery network can send IP prefixes that would be served by a certain cache or a given time period when a certain cache needs to be used. As another example the download content delivery network may aggregate user equipment specific information. In that case the upstream content delivery network may send a specific request to the downstream content delivery network enquiring about a status of the user equipment such as mobility patterns or connection quality. Therefore fast provision of these information may be provided by the download content delivery network to the upstream content delivery network.

According to a further preferred embodiment of the invention, a variation in the probability of the actual optimal content delivery entity is used for calculating the future time intervals. This enables a determination in particular how much the best content delivery entity or cache for the content stream changes over time. Depending on this variation in a certain time period for example the downstream content delivery network is able to estimate the length of the next time interval or timeframe such that can estimate with high probability the "best" content delivery entity function will deliver the best content delivery/caches for this next time interval. A downstream content delivery network entity may therefore extrapolate the variance of the best-content delivery entity or cache selection in a certain timeframe in order to estimate the next future timeframe such that this next future timeframe has a high probability of including the optimal content delivery entity, preferably at each individual chunk link of a HAS content stream. For example the download content delivery network can calculate the timeframe and surrogates/caches based on several different variables for a given UE, $v_1(UE), v_2(UE), \ldots, v_i(UE)$. By calculating the overall best surrogate/cache multiple times within each timeframe $[t_n, t_{n+1}]$, the downstream content delivery network can estimate the probability of a surrogate/cache being optimal at $t_n$ and not being optimal at $t_{n+1}$, and thus calculate the length of the next timeframe/time interval. More precisely, in each timeframe the downstream content delivery network calculates f times:

$$\text{Best\_Surrogate}(UE[t_{n+(x^*j)}])=\text{Aggregate}(v_1(UEt_{n+(x^*j)}), v_2(UEt_{n+(x^*j)}), \ldots, v_i(UEt_{n+(x^*j)})),$$

where
$j=(t_{n+1}-t_n)/f$,
$x=0, \ldots, f$,
and Aggregate( ) may be a downstream content delivery network specific function for combining several input variables to determine the best surrogate/cache in the downstream content delivery network given these variables. The optimal cache may then be provided.

The variation in best cache over time may be then be calculated with the derivative:

$$\frac{\Delta \text{Best Surrogate}(UE[tn+(x^*j)])}{\Delta x}$$

i.e. how much the best surrogates changes over time. Depending on this variation in time period/time interval $[t_n, t_{n+1}]$, the downstream content delivery network can estimate the length of the next timeframe, such that it can estimate that with high probability the "best-surrogate" function will deliver the best surrogates/caches for this next timeframe.

FIG. 1 shows a schematic view of a system according to an embodiment of the present invention.

In FIG. 1, a high-level overview of a system according to a first embodiment of the present invention is shown.

In FIG. 1, an upstream content delivery network uCDN is shown comprising an upstream content delivery request routing entity uCDN RR. Correspondingly the download content delivery network dCDN comprises a download content delivery network request routing entity dCDN RR. The upstream content delivery network uCDN hosts an original content and is responsible for deciding if the requested content is served by itself or if the user equipment UE uses a content delivery entity A, B, C denoted in FIG. 1 as dCDN surrogates. The downstream content delivery network dCDN is the network, where the user equipment UE is expected to get the requested content from. The upstream content delivery network request routing entity uCDN RR is responsible for creating manifest files in case of a HAS content stream, thereby deciding the content delivery entity A, B, C that could serve the HAS content stream for the requesting user equipment UE.

Both content delivery networks uCDN, dCDN are connected via corresponding content delivery network interfaces CDNI. The content delivery network interfaces CDNI are used to convey information between both content delivery networks dCDN, uCDN. If the user equipment UE connected to the downstream content delivery network dCDN requests an HAS content stream from the upstream content delivery network request routing entity uCDN RR in a first step 1, the upstream content delivery network request routing entity uCDN RR rewrites the manifest file MF1 at the time $t_n$ valid for time interval $[t_n, t_{n+1}]$ according to the information that had received from the downstream content delivery network dCDN and sends the rewritten manifest file MF1 in a second step 2 back to the user equipment UE. This manifest file MF1 for the period $[t_n, t_{n+1}]$ includes direct links to downstream surrogates/caches/content delivery entities A, B, C but only for this given time interval $[t_n, t_{n+1}]$. According to this manifest file the user equipment UE connects to content delivery entity C in a third step 3.

When the time period is over at the time point $t_{n+1}$ the user equipment UE is linked to the next manifest file MF2 for the next time period/time interval $[t_{n+1}, t_{n+2}]$ and requests and receives it from the upstream content delivery network request routing entity uCDN RR in a fifth respectively sixth step 5, 6. At the time point $t_{n+1}$ the user equipment UE then evaluates the current received manifest file MF2 and connects to the next content delivery entity B according to the actual manifest file MF2. After completion of the time interval $[t_{n+1}, t_{n+2}]$ at the time point $t_{n+2}$ the user equipment UE requests from the upstream content delivery network request routing entity uCDN RR the next manifest file and so on.

The downstream content delivery network dCDN calculates during each time period/time interval $[t_n, t_{n+1}]$, $[t_{n+1}, t_{n+2}]$ the manifest file information for the following timeframe $[t_{n+1}, t_{n+2}]$, respectively $[t_{n+2}, t_{n+3}]$ etc. and sends this information, in particular the time length of the next time interval and the corresponding optimal downstream content delivery network caches/content delivery entities A, B, C to be used during the period of the corresponding timeframe to the upstream content delivery network uCDN.

The downstream content delivery network dCDN also calculates the end of the next timeframe $t_{n+2}$ based on its estimations regarding the ability to predict optimal caches/optimal content delivery entities with high probability. For instance in case a user of the user equipment is moving fast in the downstream content delivery network and changes data connectivity, for example from EDGE to UMTS and/or HSDPA or the like frequently, the time interval/timeframe might have a shorter length compared in case the user moves slowly and thus can change connectivity.

In FIG. 1, it is shown that a user equipment moves from time $t_n$ to $t_{n+1}$ and that in the time interval $[t_n, t_{n+1}]$ surrogate/content delivery entity C was best while at the time $t_{n+1}$ for the time interval $[t_{n+1}, t_{n+2}]$ surrogate/content delivery entity B is best. The corresponding downstream content delivery network request routing entity dCDN RR is not involved in the above mentioned steps, effectively leaving full request routing control at the upstream content delivery network uCDN.

FIG. 2 shows a part of a message chart of a method according to a further embodiment of the present invention.

In FIG. 2, a detailed message chart for fetching manifest files by a user equipment according to a second embodiment of the present invention is shown. The nodes in the message chart are as follows:

uCDN: Upstream content delivery network, which hosts the original content and is responsible for deciding if the requested content is served by itself, or if the client is redirected to a downstream content delivery network.

dCDN: Downstream content delivery network, where the client is expected to get the content from.

uCDN Request Routing (uCDN RR): This entity is responsible for creating manifest files, thereby deciding the dCDN cache that should serve the content for the requesting client.

uCDN DNS-server: The Authoritative DNS server for the requested content and resides at the uCDN.

uCDN HTTP-server: The HTTP-server hosting the original content and possessing the right to create manifest files, and resides at the uCDN.

uCDN CDNI interface: This is the interface used to interact with dCDNs.

dCDN CDNI interface: This is the interface used by the dCDN to interact with uCDN.

dCDN DNS-server: The dCDN's DNS server dCDN Cache-1, dCDN Cache-2, dCDN Cache-3 denoted with C1, C2, C3: The various caching entities present in the dCDN.

UE: Is the user-entity requesting for the content and resides in the dCDN.

When a user equipment UE according to FIG. 2 requests to retrieve an adaptive stream for "movie_01" in a first step S1 it needs to resolve the DNS address of the corresponding URL "movies.provider.com" in a second step S2. According to FIG. 2, the upstream content delivery network uCDN is in control of the corresponding DNS domain, for example the content provider of "movie_01" as delegated this responsibility to the upstream content delivery network uCDN. In a third step S3, the user equipment UE connects to the HTTP server at the IP address returned by the DNS query and retrieves in a fourth step S4 the first manifest file for "movie_01". This first manifest file includes the list of links directly to downstream content delivery network caches C1, C2, C3. In FIG. 2, the request routers/request routing entities of the upstream content delivery network uCDN comprises a DNS component and a HTTP component. Further a part of the upstream content delivery network request routing is proactively encoded in the manifest files sent to the user equipment UE.

In a fifth step S5, the user equipment resolves the IP addresses of the caches C1, C2, C3 in the first manifest file, i.e. for the first chunk_001. The upstream content delivery network uCDN may stack or prepend downstream content delivery network caches C1, C2, C3 as DNS subdomains and directly redirect to the downstream caches C1, C2, C3 via DNS. In case the downstream content delivery network dCDN does not want to disclose the IP addresses of its caches C1, C2, C3 to the upstream content delivery network uCDN, the URLs provided in the manifest files for each chunk may include a DNS domain under the control of the downstream content delivery network dCDN. In this case, which is not shown in FIG. 2, the downstream content delivery network's DNS request routers then redirect the user equipment UE to the corresponding caches C1, C2, C3. However, even though the download content delivery network DNS request router is now involved, the downstream content delivery network dCDN could not influence request routing much: In principle the downstream content delivery network dCDN is now involved in request routing for a series of chunks for which the corresponding manifest file redirects to the same cache C1, C2, C3 since there is only one DNS query by the user equipment UE for such a series. The downstream content delivery network dCDN however does not know for what period the DNS response influences the retrieval of chunks by the user equipment UE, since the manifest file is being done by the upstream content delivery network uCDN and is not visible to the downstream content delivery network dCDN.

After resolving the corresponding DNS for "cache1.movies.provider.com" the user equipment then issues a HTTP get request for "cache1.movies.provider.com/movie_01/chunk_001" in a sixth step S6 and receives the corresponding chunk from cache C1. The same applies for "chunk_002" since the manifest file has an entry for chunk_002 linked with cache 1 C1. In a seventh step S7 for "chunk_003" the user equipment UE resolves the IP address for the domain "cache2.movies.provider.com" and issues a HTTP get request for "cache2.movies.provider.com/movie_01/chunk_003" in an eighth step S8 and receives a corresponding chunk from cache C2. At the end of first manifest file a link is included for the second manifest file: "movies.provider.com/movie_01/manifest_001". Therefore in a ninth step S9 the user equipment UE contacts the HTTP server of the upstream content delivery network uCDN for retrieving the second manifest file in a tenth step S10. Therefore at the end of the first manifest file for the first period a link is included for the next manifest file and the user equipment UE retrieves this second manifest file from the upstream content delivery network HTTP request router and the steps S5-S9 are executed or performed correspondingly.

The upstream content delivery network and the download content delivery network uCDN, dCDN are connected via corresponding upstream content delivery network respectively downstream content delivery network interfaces. These interfaces are used to convey information for manifest file creation from the downstream content delivery network dCDN to the upstream content delivery network uCDN denoted with reference sign T. In case of a bootstrapping scenario, i.e. computing the initial or first manifest file and starting the procedure according to FIG. 2 a simple redirection to the downstream content delivery network request router dCDN RR in FIG. 2 for a given number of chunks can be expressed in the first or initial manifest file the user equipment UE retrieves. The process may be for example started according to the procedure "Absolute URLs with redirection" for the initial manifest file. This initial or first manifest file may then contain at the end a link to the next consecutive manifest file to be retrieved at the upstream content delivery network request router uCNR RR. This second manifest file may then contain already direct links to content delivery entity/caches/surrogate to the downstream content delivery network dCDN being based on the information for manifest file computation the upstream content delivery network uCDN has retrieved from the downstream content delivery network dCDN within the timeframe of the initial or first manifest file. The downstream content delivery network dCDN can exploit/aggregate and/or combine the following information for calculating the "best" or "optimal" cache/content delivery entity for any time period:

The mobility pattern of the end user in the last time period, i.e. how fast a user changes his/her location The data connectivity available in the geographic region the user is currently in; e.g. in case a user moves slowly and is in a large region that is only covered with EDGE connectivity, it can be estimated that the user will not have more than ~64-220 kbit/s download bandwidth in the near future. This information is then used for calculating the optimal surrogate/cache.

Downstream CDN internal state information such as load on surrogates/caches, congestion in the downstream CDN network, maximum bandwidth on links to surrogates, etc.

In summary, the present invention provides a tradeoff between downstream content delivery network flexibility and overall request routing load in content delivery network interfaces in particular for adaptive streaming. The present invention provides low overhead on the content delivery network interface control plane for handling in particular adaptive streaming in content delivery network interfaces and optimizes redirection to best caches/content delivery entities in the downstream content delivery network at each point in time minimizing a request routing traffic.

The present invention further enables the downstream content delivery networks local knowledge to be exploited without high overhead on the content delivery network request routing interface. Even further the present invention enables a determination of an optimal video-length/timeframe each manifest file should include links to and enables to facilitate user equipment to initiate a request for the next manifest file by additional meta-data information.

The present invention has inter alia the following advantages: In particular for lifestreaming the download content delivery network may participate in a decision making process for cache selection based on load observed and may inform the upstream content delivery network if load increases. The user equipment is redirected in particular directly to the best surrogate/cache/content delivery entity in the downstream content delivery network and the downstream content delivery network does not swamp the upstream content delivery network with content delivery interface request routing information. The present invention enables an optimal cache selection underchanging network conditions and frequency of informing the upstream content delivery network about these changing conditions.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for providing content in content delivery networks having an upstream content delivery network, and a downstream content delivery network comprising at least two content delivery entities, wherein the upstream content delivery network and the downstream content delivery network are connected to each other and a user equipment is connected to the downstream content delivery network, the method comprising:
   receiving a request from the user equipment for a content stream for a content from the downstream content delivery network;
   providing, by the upstream content delivery network, the content stream;
   redirecting the content stream from the upstream content delivery network to a content delivery entity of the at least two content delivery entities in the downstream content delivery network, wherein the user equipment is connectable to the at least two content delivery entities;
   providing, by the content delivery entity in the downstream content delivery network, the content stream to the user equipment, wherein the user equipment obtains an address of the content delivery entity in the downstream content delivery network from a manifest file generated by the upstream content delivery network; and
   performing at least twice:
      determining at least one of network information of the downstream content delivery network or user equipment information,
      determining probabilities of optimized content stream performance to the user equipment for each of the at least two content delivery entities based on the determined at least one of network information of the downstream content delivery network or the user equipment information,
      providing, by the upstream content delivery network, a next manifest file comprising an address of a different one of the at least two content delivery entities with a highest probability among the determined probabilities in response to a request from the user equipment that is triggered by meta-data included in a most recent manifest file that links to the next manifest file,
      connecting the user equipment to the content delivery entity with the highest probability, and
      redirecting the content stream to the content delivery entity with the highest probability for providing the content stream to the user equipment;
   wherein time intervals are calculated for performing the steps that are performed at least twice using actual or previous user equipment information, wherein a time interval indicates how long a manifest file is valid.

2. The method according to claim 1, wherein connecting the user equipment to the content delivery entity with the highest probability among the probabilities of optimized content stream performance to the user equipment and redirecting the content stream to the content delivery entity for providing the content stream to the user equipment are induced by the upstream content delivery network.

3. The method according to claim 1, wherein the time intervals are further calculated based on actual and/or previous network information.

4. The method according to claim 3, wherein a variation in a probability of an actual optimal content delivery entity of the at least two content delivery entities is used for calculating future time intervals.

5. The method according to claim 1, wherein for determining the user equipment information, data connectivity in geographic region of the user equipment (UE) and/or mobility pattern of the user equipment is determined.

6. The method according to claim 1, wherein the network information is determined using internal state information of the downstream content delivery network.

7. The method according to claim 6, wherein the internal state information of the downstream content delivery network comprises load on the at least two content delivery entities, congestion within the downstream content delivery network, and/or maximum bandwidth of links to the at least two content delivery entities.

8. The method according to claim 1, wherein content stream type information of the content stream is evaluated based on the network information, and based on an evaluation of the content stream type information, adjustments are made for:
   providing, by the upstream content delivery network, the content stream;
   redirecting the content stream from the upstream content delivery network to the content delivery entity of the at least two content delivery entities in the downstream content delivery network; and
   providing, by the content delivery entity in the downstream content delivery network, the content stream to the user equipment.

9. The method according to claim 1, wherein meta-data is included in the content stream and evaluated by the user equipment.

10. The method according to claim 1, wherein information for a next future content delivery entity is prefetched by the user equipment.

11. The method according to claim 10, wherein prefetching of the information for the next future content delivery entity is performed regularly after certain time intervals based on time durations of a portion of the content stream and a round trip time of the portion of the content stream.

12. The method according to claim 1, wherein the downstream content delivery network initiates and/or performs:
   the determining the at least one of network information of the downstream content delivery network or the user equipment information, and
   the determining the probabilities of optimized content stream performance to the user equipment for each of the content delivery entities based on the determined at least one of network information of the downstream content delivery network or the user equipment information.

13. The method according to claim 1, wherein the downstream content delivery network includes an edge entity comprising an interface to the upstream content delivery network and aggregates information of the at least two content delivery entities.

14. The method according to claim 1, wherein the steps which are performed at least twice are performed continuously in certain time intervals until the content stream has ended.

15. The method according to claim 1, wherein determining probabilities of optimized content stream performance to the user equipment is performed multiple times within each time interval to calculate duration of a next time interval.

16. The method according to claim 1, wherein user equipment information includes a data connectivity in a geographic region of the user equipment and/or a mobility pattern of the user equipment.

17. A system for providing content in content delivery networks, comprising:
 an upstream content delivery network;
 a downstream content delivery network comprising at least two content delivery entities, wherein the upstream content delivery network and the downstream content delivery network are connected to each other; and
 a user equipment connected to the downstream content delivery network,
 wherein the user equipment is configured to request a content stream for a content from the downstream content delivery network,
 wherein the upstream content delivery network is configured to provide the content stream to the downstream content delivery network, wherein the user equipment obtains an address of the content delivery entity in the downstream content delivery network from a manifest file generated by the upstream content delivery network,
 wherein at least one of the upstream content delivery network and/or the downstream content delivery network are configured to redirect the content stream to a content delivery entity of the at least two content delivery entities in the downstream content delivery network, wherein the user equipment is connectable to the at least two content delivery entities, and
 wherein the content delivery entity of the at least two content delivery entities in the downstream content delivery network is configured to provide the content stream to the user equipment (UE),
 wherein the upstream content delivery network is configured to perform at least twice:
  determine at least one of network information of the downstream content delivery network or user equipment information,
  determine probabilities of optimized content stream performance to the user equipment for each of the content delivery entities based on the determined at least one of network information of the downstream content delivery network or user equipment information for optimized content stream performance,
  provide a next manifest file comprising an address of a different one of the at least two content delivery entities with a highest probability among the determined probabilities in response to a request from the user equipment triggered by meta-data included in a most recent manifest file that links to the next manifest file,
  connect the user equipment to the content delivery entity with the highest probability, and
  redirect the content stream to the content delivery entity with the highest probability for providing the content stream to the user equipment;
 wherein time intervals are calculated for performing the steps that are performed at least twice using actual or previous user equipment information, wherein a time interval indicates how long a manifest file is valid.

18. The system according to claim 17, wherein the upstream content delivery network is configured to perform the steps which are performed at least twice continuously in certain time intervals until the content stream has ended.

19. The system according to claim 17, wherein determining probabilities of optimized content stream performance to the user equipment is performed multiple times within each time interval to calculate duration of a next time interval.

20. The system according to claim 17, wherein user equipment information includes a data connectivity in a geographic region of the user equipment and/or a mobility pattern of the user equipment.

* * * * *